United States Patent
Chen

(10) Patent No.: US 12,013,815 B2
(45) Date of Patent: *Jun. 18, 2024

(54) METHOD FOR PROCESSING RESOURCE DESCRIPTION FILE, PAGE RESOURCE ACQUISITION METHOD, AND INTERMEDIATE SERVER

(71) Applicant: WANGSU SCIENCE & TECHNOLOGY CO., LTD., Shanghai (CN)

(72) Inventor: Long Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 482 days.

This patent is subject to a terminal disclaimer.

(21) Appl. No.: 17/296,970

(22) PCT Filed: Jan. 17, 2019

(86) PCT No.: PCT/CN2019/072177
§ 371 (c)(1),
(2) Date: May 25, 2021

(87) PCT Pub. No.: WO2020/124723
PCT Pub. Date: Jun. 25, 2020

(65) Prior Publication Data
US 2021/0406217 A1 Dec. 30, 2021

(30) Foreign Application Priority Data
Dec. 18, 2018 (CN) .......................... 201811550205.1

(51) Int. Cl.
*G06F 16/00* (2019.01)
*G06F 16/14* (2019.01)
(Continued)

(52) U.S. Cl.
CPC .......... *G06F 16/148* (2019.01); *G06F 40/146* (2020.01); *G06F 40/221* (2020.01); *H04L 67/02* (2013.01)

(58) Field of Classification Search
CPC ..................................................... G06F 16/148
(Continued)

(56) References Cited

U.S. PATENT DOCUMENTS

| 2005/0138004 | A1* | 6/2005 | Teplitsky | ............ G06F 16/9566 707/E17.115 |
| 2006/0069744 | A1 | 3/2006 | Alberti et al. | |
| 2017/0308511 | A1* | 10/2017 | Beth | ...................... G06F 40/169 |

FOREIGN PATENT DOCUMENTS

| CN | 103281387 A | 9/2013 |
| CN | 104168337 A | 11/2014 |

(Continued)

OTHER PUBLICATIONS

The World Intellectual Property Organization (WIPO) International Search Report for PCT/CN2019/072177 dated Sep. 4, 2019 5 pages.

*Primary Examiner* — Chelcie L Daye

(57) ABSTRACT

Method for processing a resource description file includes: receiving an access request directed to a target page from a client terminal, and receiving the resource description file fed back by an origin server with respect to the access request after transmitting the access request to the origin server; identifying one or more resource links in the resource description file and determining whether the one or more resource links include one or more external links; if the one or more resource links include the one or more external links, rewriting an external link of the one or more resource links to an internal link and replacing the external link in the resource description file with a corresponding internal link formed by rewriting the external link; and feeding back a rewritten resource description file to the client terminal to (Continued)

acquire resource of the target page according to the rewritten resource description file.

20 Claims, 5 Drawing Sheets

(51) Int. Cl.
    *G06F 40/146*      (2020.01)
    *G06F 40/221*      (2020.01)
    *H04L 67/02*      (2022.01)

(58) Field of Classification Search
    USPC .......................................................... 707/822
    See application file for complete search history.

(56) References Cited

FOREIGN PATENT DOCUMENTS

| | | |
|---|---|---|
| CN | 104426925 A | 3/2015 |
| CN | 204291040 U | 4/2015 |
| CN | 104754073 A | 7/2015 |
| CN | 105072020 A | 11/2015 |
| CN | 108804514 A | 11/2018 |

\* cited by examiner

METHOD FOR PROCESSING RESOURCE DESCRIPTION FILE, PAGE RESOURCE ACQUISITION METHOD, AND INTERMEDIATE SERVER

CROSS-REFERENCES TO RELATED APPLICATIONS

This application is a national phase entry under 35 U.S.C. § 371 of International Application No. PCT/CN2019/072177, filed on Jan. 17, 2019, which claims priority of Chinese patent application No. 201811550205.1, filed with the State Intellectual Property Office of P. R. China on Dec. 18, 2018, the entire contents of all of which are incorporated herein y reference in their entirety.

FIELD OF THE DISCLOSURE

The present disclosure generally relates to the field of Internet technologies and, more particularly, relates to a method for processing a resource description file, a page resource acquisition method, and an intermediate server.

BACKGROUND

Website pages usually include various resources. These resources may include documents, scripts, page styles, or pictures. When a client terminal requests to load a certain page, the client terminal usually sends a page access request to a server, and then the server feeds back a resource description file to the client terminal with respect to the page access request. The resource description file may include a link of each resource in the page. Therefore, the client terminal can acquire a corresponding resource according to each link in the resource description file.

To improve loading speed of a page, a content delivery network (CDN) is used to accelerate the client terminal's page access request. However, there is a problem that the acceleration mode of existing technology can only accelerate an internal link of the page but cannot accelerate an external link of the page. It is because the CDN usually provides acceleration service by redirecting a DNS of a domain name. Specifically, the CDN redirects the DNS of the page to an edge node of the CDN, so that the client terminal can access a corresponding resource nearby. However, for the external link, the CDN cannot redirect the DNS of the external link. Correspondingly, the external link cannot be accelerated by the CDN. And the page to be accessed may contain a resource that needs to be acquired through an external link and then the resource description file received by the client terminal may also include the external link. This part of external links cannot be accelerated by the CDN, and the overall page loading speed may be slow.

SUMMARY

The disclosed embodiments of the present disclosure provide a method for processing a resource description file, a page resource acquisition method, and an intermediate server, for improving loading speed of a page.

To achieve above goals, one aspect of the present disclosure provides a method for processing a resource description file. The method includes: receiving an access request directed to a target page sent by a client terminal, and after forwarding the access request to an origin server, receiving the resource description file fed back by the origin server with respect to the access request; identifying one or more resource links included in the resource description file and determining whether the one or more identified resource links include one or more external links, and if the one or more external links are included, rewriting the one or more external links to internal links and using an internal link formed by rewriting a corresponding external link to replace the corresponding external link in the resource description file; and feeding back the rewritten resource description file to the client terminal, such that the client terminal acquires resource of the target page according to the rewritten resource description file.

To achieve above goals, another aspect of the present disclosure provides an intermediate server. The intermediate server includes: a resource description file acquisition unit, configured to receive an access request directed to a target page sent by a client terminal and to receive a resource description file fed back by an origin server with respect to the access request after the access request is forwarded to the origin server; a link rewriting unit, configured to identify one or more resource links included in the resource description file and determine whether the one or more identified resource link include one or more external links; and if including the one or more external link, to rewrite the one or more external links to internal links and use an internal link formed by rewriting a corresponding external link to replace the corresponding external link in the resource description file; and a resource description file feedback unit, configured to feed back the rewritten resource description file to the client terminal, such that the client terminal acquires resource of the target page according to the rewritten resource description file.

To achieve above goals, another aspect of the present disclosure provides an intermediate server. The intermediate includes a memory and a processor. The memory is configured to store computer programs, and the computer programs are configured to be executed by the processor, to implement a method for processing a resource description file according to any one of the embodiments of the present disclosure.

To achieve above goals, another aspect of the present disclosure provides a page resource acquisition method. The page resource acquisition method includes: receiving a resource acquisition request of a target page sent by a client terminal; determining whether the resource acquisition request includes one or more target links consistent with a link rewriting rule; if including the one or more target links are consistent with the link rewriting rule, extracting page address information from the one or more target links and parsing the page address information to corresponding external links; and acquiring page resource corresponding to the external links obtained by parsing and feeding back the page resource to the client terminal.

To achieve above goals, another aspect of the present disclosure provides an intermediate server. The intermediate server includes: a resource acquisition request receiving unit, configured to receive a resource acquisition request directed to a target page sent by a client terminal; a link determination unit, configured to determine whether the resource acquisition request includes one or more target links consistent with a link rewriting rule; a page address information parsing unit, configured to extract page address information from the one or more target links and parse the page address information to corresponding external links if the resource acquisition request includes the one or more target links consistent with the link rewriting rule; and a resource feedback unit, configured to acquire page resource corresponding to the external links obtained by parsing and feed back the page resource to the client terminal.

To achieve above goals, another aspect of the present disclosure provides an intermediate server. The intermediate includes a memory and a processor. The memory is configured to store computer programs, and the computer programs are configured to be executed by the processor, to implement a page resource acquisition method according to any one of the embodiments of the present disclosure.

In the technical solutions provided by the present disclosure, after receiving the access request directed to the target page from the client terminal, the intermediate server may forward the access request to the origin server and block the resource description file fed back to the client terminal by the origin server. The intermediate server may analyze the content of the resource description file and identify the one or more external links in the resource description file. Since the intermediate server in the CDN cannot accelerate the one or more external links directly, the intermediate server may rewrite the one or more external links to a form of internal links, and use an internal link formed by rewriting a corresponding external link to replace the corresponding external link in the resource description file. In this way, after rewriting each of the one or more external links in the resource description file, the rewritten resource description file may be transmitted to the client terminal. Subsequently, the client terminal may initiate the resource acquisition request with respect to each link in the rewritten resource description file one by one. Since each of the links in the rewritten resource description file has a form of internal link, each of the resource acquisition requests can be received by the intermediate server consequently. The intermediate server then may distinguish links included in the received resource acquisition requests, to identify one or more target links carrying a specified resource path. The specified resource path may indicate that the one or more target links are not originally the internal links, but the internal links formed by rewriting the external links. Correspondingly, for the one or more target links, the intermediate server may parse actual external links, and acquire corresponding resource according to the parsed external links to feed back the resource to the client terminal. It can be seen that, in the technical solutions provided by the present disclosure, by rewriting one or more of the external links, the links in the resource acquisition request subsequently received by the intermediate server may be guaranteed to have the form of internal link, and therefore each of links may be guaranteed to be accelerated by the intermediate server. Then the intermediate server may revert the internal link formed by rewriting the corresponding external link to the corresponding external link by identifying the specified resource path and then acquire the resource corresponding to the external link. In this way, both the internal links and the external links may be accelerated by the intermediate server in the CDN, and the loading speed of the page as a whole may be improved.

BRIEF DESCRIPTION OF THE DRAWINGS

To more clearly illustrate the technical solutions of the present disclosure, the accompanying drawings to be used in the description of the disclosed embodiments are briefly described hereinafter. Obviously, the following drawings are merely examples for illustrative purposes of the present disclosure. For those of ordinary skill in the art, other drawings can be obtained based on these drawings without creative labor.

DETAILED DESCRIPTION

To more clearly describe the objectives, technical solutions, and advantages of the present disclosure, the present disclosure is further illustrated in detail with reference to the accompanying drawings in conjunction with embodiments.

The present disclosure provides a method for processing a resource description file. The method may be applied to an existing CDN structure. In the CDN structure, a client terminal and an origin server may be connected through a CDN network. The client terminal may be a terminal device used by a user, and the origin server may be a service server storing various resources in a website page. The CDN network may include one or more intermediate servers, and an intermediate server of the one or more intermediate servers may receive a page access request from the client terminal and process the page access request.

Figure 1:
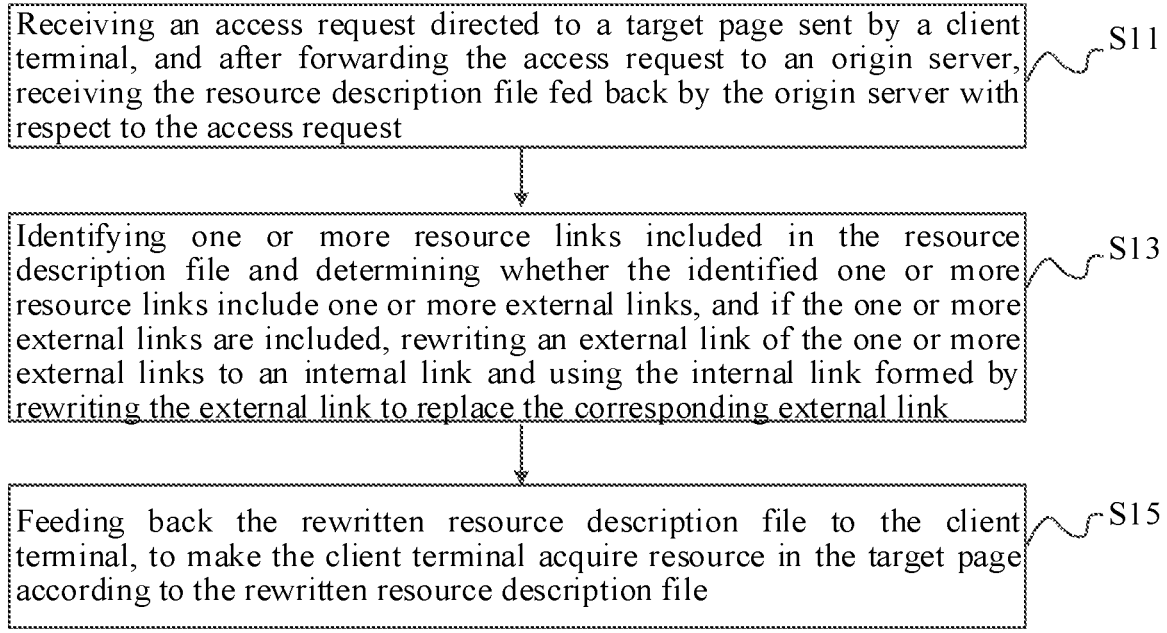
FIG. 1 illustrates an exemplary method for processing resource description files consistent with various embodiments of the present disclosure.
Figure 2:
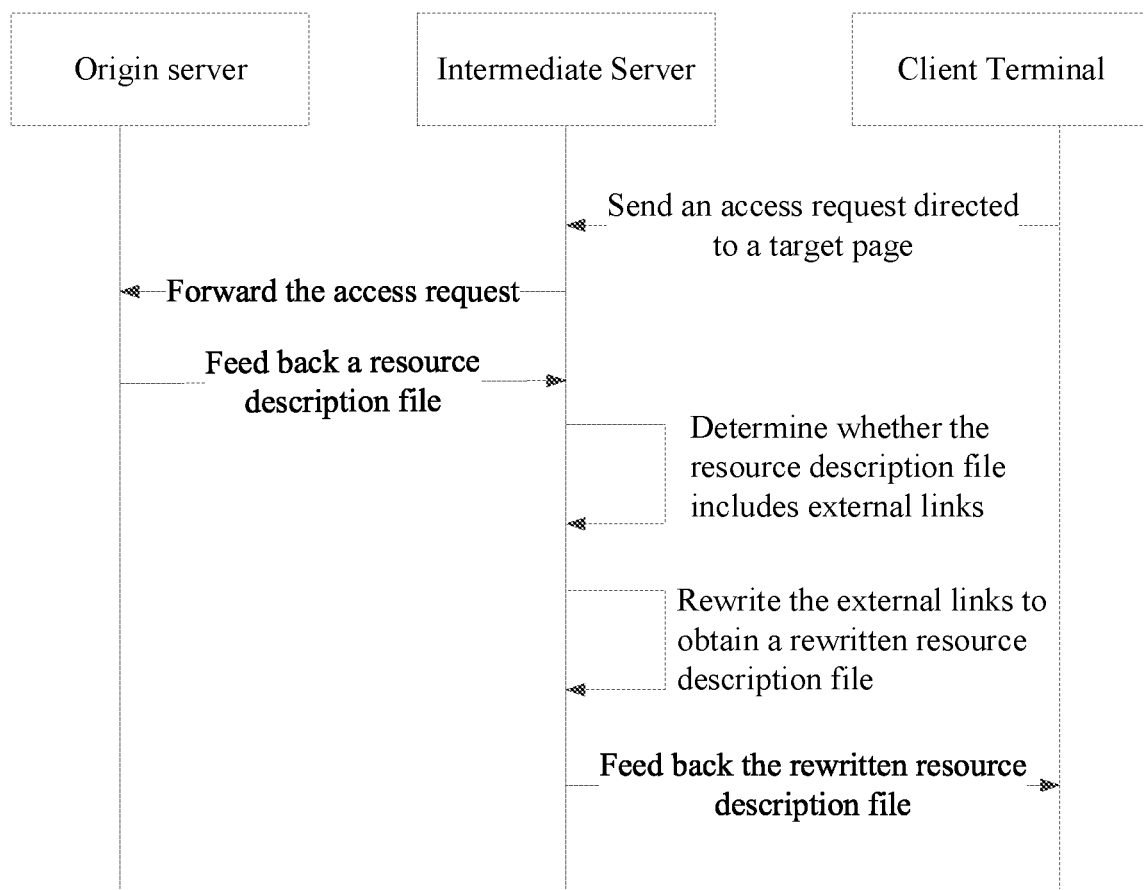
FIG. 2 illustrates an interaction diagram of an exemplary method for processing resource description files consistent with various embodiments of the present disclosure.

As illustrated in FIGS. 1-2 in detail, the method for processing the resource description file may be executed by an intermediate server of the one or more intermediate servers. The method of processing the resource description file may include the following steps:

S11: after receiving an access request sent by the client terminal and directed to a target page and forwarding the access request to the origin server, receiving the resource description file fed back by the origin server with respect to the page access request.

In the present embodiment, when the user wants to access the target page through the client terminal, the client terminal may initiate the access request directed to the target page. The access request may include a domain name of the target page. The access request may be received by a nearby intermediate server of the one or more intermediate servers, and then the intermediate server may forward the access request to the origin server corresponding to the domain name, according to the domain name carried in the access request.

In the present embodiment, after receiving the access request, the origin server may identify the domain name included in the access request, and search for the resource description file corresponding to the domain name. The resource description file may be an HTML document. The HTML document may include a resource link corresponding to each resource in the target page.

S13: identifying one or more resource links in the resource description file and determining whether the identified one or more resource links include one or more external links; if the identified one or more resource links include the one or more external links, rewriting an external link of the one or more external links to an internal link and using the internal link formed by rewriting a corresponding external link to replace the corresponding external link in the resource description file.

In the present embodiment, the identified one or more resource links in the resource description file may be assigned values through link attribute identifiers. In one application example, the link attribute identifiers may be src. A resource link in the resource description file may look like this:

<script src="https://www.123.com/1.js"></script>, where src labels a link attribute identifier, and content in quotations after the src equal sign may be a value assigned to the src attribute. The intermediate server then may identify the link resource identifiers in the resource description file and use the assignments of the link attribute identifiers as the resource links included in the resource description file. In the above application example, https://www.123.com/1.js may be used as a resource link.

In the present embodiment, the resource links in the resource description file may be identified using above method one by one. Then the external links and the internal links of the resource links may be distinguished. Specifically, the external links and the internal links among the resource links may be distinguished by the domain names. If a resource link does not include a domain name, the resource link may be a link with the default domain name and usually may be an internal link. For example, a link like script like src="/js/jquery.js" is necessarily an internal link. If a resource link includes a domain name, the domain name of the resource link may be further determined whether it is consistent with the domain name of the target page. If the domain name of the resource link is consistent with the domain name of the target page, the resource link may be determined to be an internal link. If the domain name of the resource link is not consistent with the domain name of the target page, the resource link may be determined to be an external link.

For example, when the domain name of the target page is www.abc.com and the identified one or more resource links include https://www.123.com/1.js and https://www.abc.com/1.js. https://www.123.com/1.js may be determined to be an external link and https://www.abc.com/1.js may be determined to be an internal link, by using the above judging method of the domain name.

In the present embodiment, since the intermediate server cannot directly accelerate the external links subsequently, after identifying the one or more external links in the resource description file, an external link of the one or more external links may be rewritten to a form of internal link. Specifically, since the domain name in an internal link needs to be consistent with the domain name of the target page, the internal link formed by rewriting the external link may also include the domain name of the target page. Besides, for distinguishing the original internal link and the internal link formed by rewriting subsequently, a specified resource path may be set up in the internal link formed by rewriting the external link. The specified resource path may be used to indicate that the current internal link is actually formed by rewriting the external link. Therefore, the internal link formed by rewriting the external link may include the domain name of the target page, the specified resource path, and the corresponding external link.

In the present embodiment, the specified resource path may be defined in the intermediate server in advance, so that subsequently, the intermediate server can identify the specific resource path correctly. For example, in an application example, the specified resource path may be expressed as/modify. Besides, since the external link may be written in a less standardized form and may include spaces or special characters, while string data transmitted to the intermediate server usually is not allowed to include spaces and special characters, the external link may be converted into corresponding string data according to a preset encoding/decoding rule when rewriting the external link, to eliminate spaces and special characters in the external link and make the converted string data meet the requirement of the uniform resource locator (URL). In one application example, the encoding/decoding rule may adopt any suitable implementation forms including a urlencode encoding/decoding rule or a base64 encoding/decoding rule. The present disclosure has no limit on this.

In this way, after acquiring the domain name of the target page and converting the external link to the string data according to the preset encoding/decoding rule, the domain name of the target page may be converged with the string data according to the preset specified resource path and the converged result may be used as the internal link formed by rewriting the external link. During practical applications, in the internal link formed by rewriting the external link, the domain name of the target page, the specified resource path, and the string data may be sorted according to a preset rule. For example, the domain name of the target page, the specified resource path, and the string data may be arranged in order from beginning to end, to form the internal link formed by rewriting the external link.

In the present embodiment, to distinguish the string data from data of other parts, the internal link formed by rewriting the external link may further include a locator identifier. The locator identifier may be located after the specified resource path, and may be assigned with a value of the string data. For example, the locator identifier may be "? url". "? url" may be assigned with a value using "? url=XXXX" where XXXX may be the string data assigned to "?url". In this way, in an application example, an external link https://www.123.com/1.js may be rewritten into an internal link "https://www.abc.com/modify? url=https %3A %2F %2Fwww.123.com %2F1.js". In this internal link, https://www.abc.com is the domain name of the target page, /modify is the specified resource path, ? url is the locator identifier, and https %3A %2F %2Fwww.123.com %2F1.js is the string data obtained by urlencode encoding.

In the present embodiment, according to the method mentioned above, the identified one or more external links may be rewritten sequentially, and therefore each external link in the resource description file may be represented using a form of internal link. After rewriting the one or more external links into the internal links, the internal link formed by rewriting the corresponding external link of the one or more external links may be used to replace the corresponding external link in the description file. Correspondingly, the rewritten resource description file may not include any external link and all of the links may be represented as the form of internal link.

S15: feeding back the rewritten resource description file to the client terminal, such that the client terminal acquires the resources of the target page according to the rewritten resource description file.

In the present embodiment, after achieving the rewritten resource description file, the rewritten resource description file may be fed back to the client terminal. Subsequently, the client terminal may acquire a corresponding page resource according to each link in the rewritten resource description file.

In one embodiment, when the description file does not include an external link originally, the above link rewriting process may be avoided and the resource description file fed back from the origin server may be transmitted to the client terminal directly.

Figure 3:
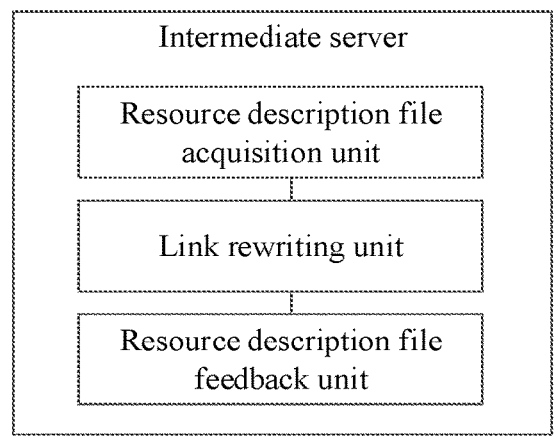
FIG. 3 illustrates functional modules of an exemplary intermediate server consistent with various embodiments of the present disclosure.

The present disclosure also provides an intermediate server. As illustrated in FIG. 3, the intermediate server may include:

a resource description file acquisition unit, configured to receive an access request directed to a target page from a client terminal, and receive a resource description file fed back by an origin server with respect to the access request after forwarding the access request to the origin server;

a link rewriting unit, configured to identify one or more resource links in the resource description file and determine whether the identified one or more identified resource links include one or more external links. If the one or more identified resource links include the one or more external links, the link rewriting unit may be further configured to rewrite the one or more external links to internal links and use an internal link formed by rewriting a corresponding external link of the one or more external links to replace the corresponding external link in the resource description file;

and a resource description file feedback unit, configured to feed back the rewritten resource description file to the client terminal, to make the client terminal acquire a corresponding page resource according to each link in the rewritten resource description file.

In one embodiment, the link rewriting unit may include:

a domain name identifying module, configured to determine whether a resource link of the one or more resource links includes a domain name. If the resource link includes a domain name, the domain name identifying module may determine whether the domain name in the resource link is consistent with the domain name of the target page. If the domain name in the resource link is consistent with the domain name of the target page, the resource link may be determined to be an internal link. If the domain name in the resource link is inconsistent with the domain name of the target page, the resource link may be determined to be an external link. If the resource link does not include a domain name, the resource link may be determined to be an internal link.

In one embodiment, the link rewriting unit may include:

a string data converting module, configured to acquire the domain name of the target page and convert the external link to string data according to a preset encoding/decoding rule; and a converging module, configured to converge the domain name of the target page and the string data according to a preset specified resource path, and to use a converging result as the internal link formed by rewriting the external link. In the internal link formed by rewriting the external link, the domain name of the target page, the specified resource path and the string data may be sorted according to a preset rule.

Figure 4:
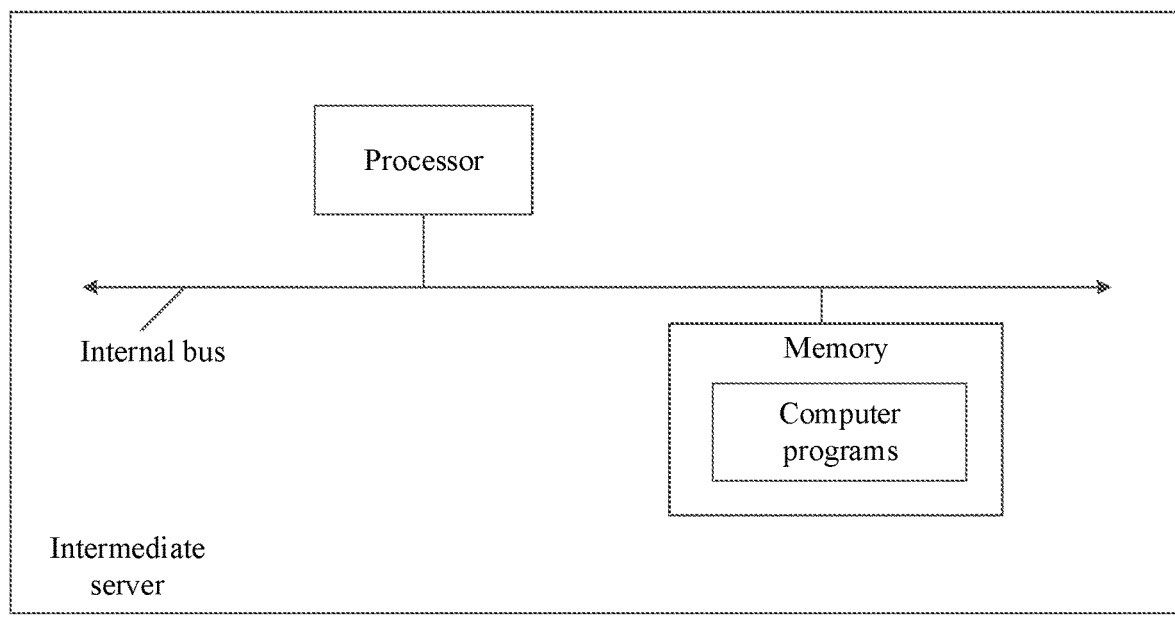
FIG. 4 illustrates a structure of an exemplary intermediate server consistent with various embodiments of the present disclosure.

As illustrated in FIG. 4, the present disclosure also provides an intermediate sever. The intermediate server may include a memory and a processor. The memory may be configured to store computer programs. When the computer programs are executed by the processor, a method for processing a resource description file provided by various embodiments of the present disclosure may be achieved. Specifically, as illustrated in FIG. 4, in a hardware level, the intermediate server may include a processor, an internal bus, and a memory. The memory may include an internal memory and a non-volatile memory. The processor may read the corresponding computer programs from the non-volatile memory into the memory and then execute the computer programs. For description purposes only, the intermediate server illustrated in FIG. 4 is used as an example to illustrate the present disclosure and should not limit the scopes of the present disclosure. For example, the intermediate server in other embodiments may include more or fewer modules than the intermediate server shown in FIG. 4. In one embodiment, the intermediate server may further include other processing hardware including a graphics processing unit (GPU). In some other embodiments, the intermediate server may have a configuration different from the server in FIG. 4. Of course, in addition to software implementations, this disclosure does not exclude other implementations, such as logic devices or a combination of software and hardware.

In the present embodiment, the processor may include a central processing unit (CPU) or a graphics processor (GPU). In some other embodiments, the processor may also include microcontroller units, logic gate circuits, integrated circuits, or a combination thereof, which have logical processing capabilities. The memory in this embodiment may be a memory device for storing information. In digital systems, the device that can store binary data may be a memory device. In integrated circuits, a circuit with a storage function that does not have a physical form may also be used as a memory device, such as RAM, FIFO. In the system, a memory device that has a physical form may also be named as a memory. When it is implemented, the memory may also be implemented in a cloud storage manner. The specific implementation manner is not limited in this disclosure.

It should be noted that the implementation manner of the intermediate server in the present disclosure may be referred to as the implementation manner of methods for processing a resource description file provided by various embodiments of the present disclosure.

Figure 5:
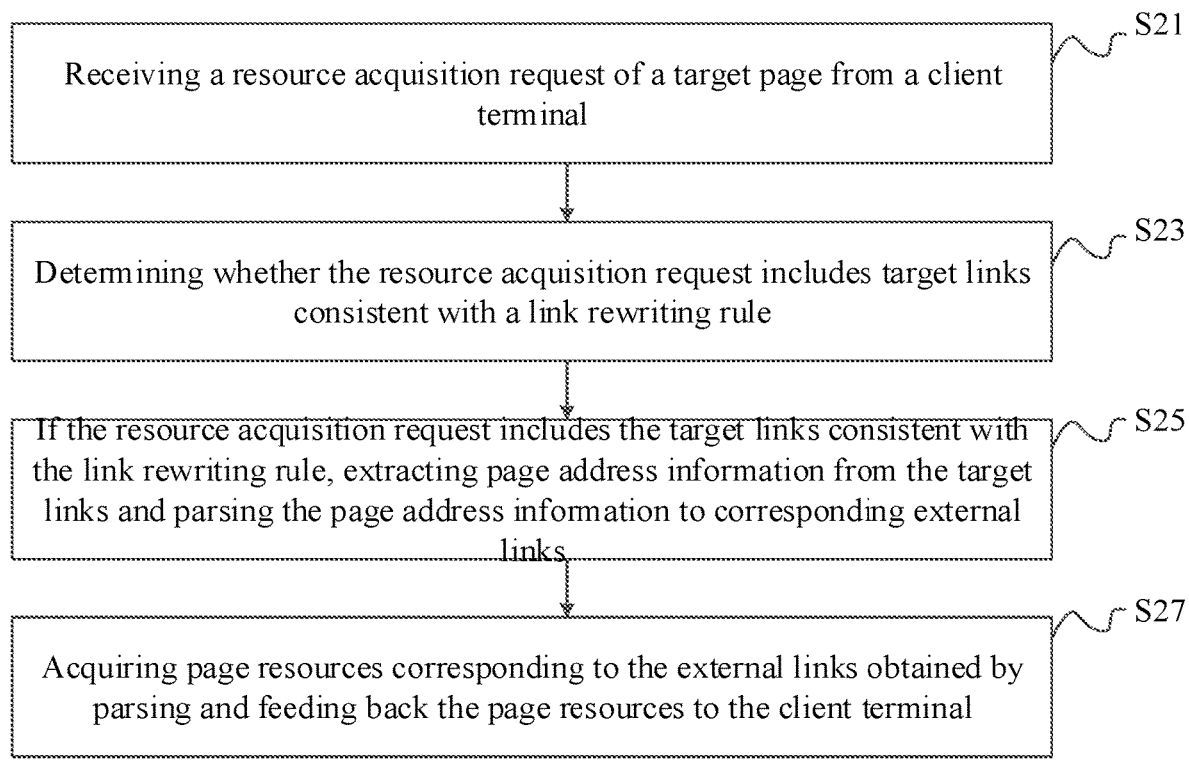
FIG. 5 illustrates an exemplary page resource acquisition method consistent with various embodiments of the present disclosure.
Figure 6:
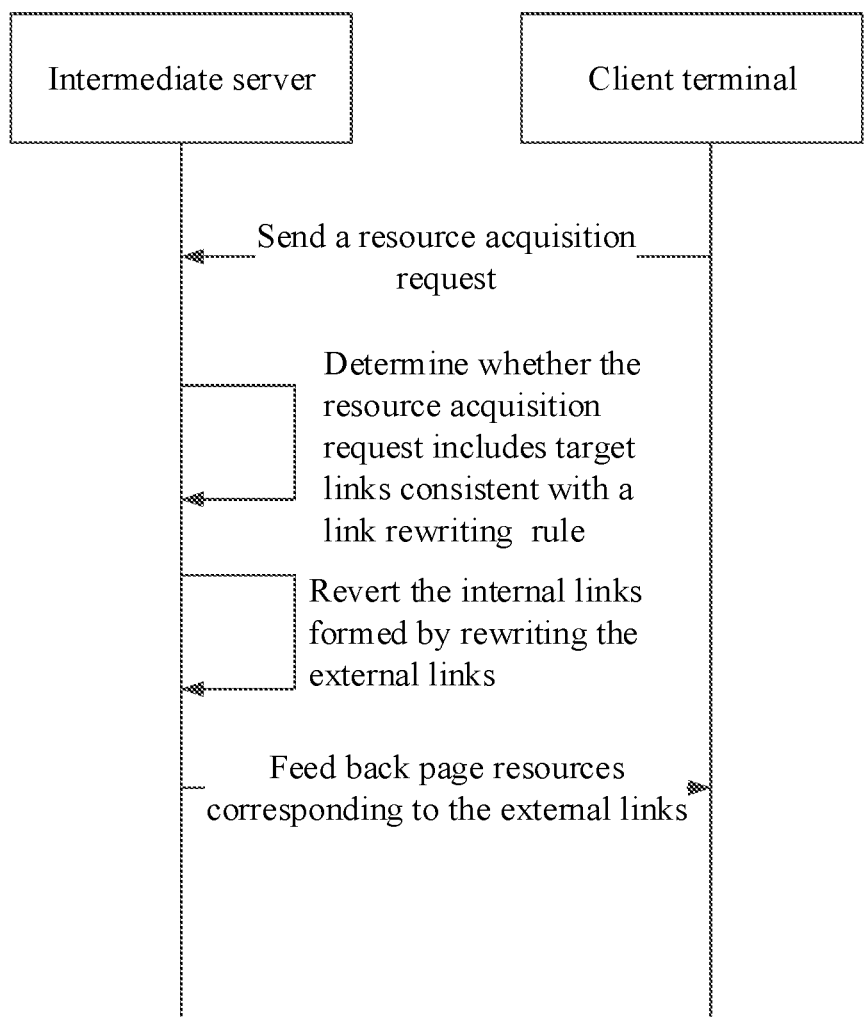
FIG. 6 illustrates an interaction diagram of an exemplary page resource acquisition method consistent with various embodiments of the present disclosure.

The present disclosure also provides a page resource acquisition method. As illustrated in FIGS. 5-6, the method may include:

S21: receiving a resource acquisition request of a target page.

In the present embodiment, when the client terminal receives the resource description file fed back by the intermediate server, the client terminal may identify each resource link included in the resource description file, and then initiate a resource acquisition request for each resource link one by one. In a practical application, to reduce a number of the requests initiated, one resource acquisition request may carry a plurality of resource links. The present disclosure has no limit on this.

S23: determining whether the resource acquisition request includes a target link consistent with a link rewriting rule.

In the present disclosure, the resource links in the resource description file may include the original internal link and the internal link formed by rewriting the external link according to the method in S11-S15. Correspondingly, the resource acquisition request initiated by the client terminal may carry the original internal link and the internal link formed by rewriting the external link. The different types of links may need different processing manners. Specifically, for the original internal link, the intermediate server may directly acquire a page resource corresponding to the original internal link and then feed back the page resource to the client terminal. For the internal link formed by rewriting the external link, the intermediate server may extract the original external link and then acquire the page resource corresponding to the external link.

Therefore, in the present embodiment, the type of each internal link included in the resource acquisition request from the client terminal may be determined first. Specifically, it may be determined whether the resource acquisition request includes a target link consistent with the link rewriting rule. The link rewriting rule may be represented by the specified resource path mentioned above. Specifically, it may be determined whether the resource acquisition request includes a link carrying the specific resource path. If the resource acquisition request includes a link carrying the specific resource path, the link carrying the specific resource path may be determined to be the target link consistent with the link rewriting rule. If the resource acquisition request does not include a link carrying the specific resource path, the resource acquisition request may be determined to not include the target link consistent with the link rewriting rule. According to the rewriting rule in S13, the internal link formed by rewriting the external link may include the specified resource path. Correspondingly, if the intermediate server identifies the specific resource path from the resource acquisition request, a link carrying the specific resource path may be determined to be the internal link formed by rewriting the corresponding external link. If the resource acquisition request does not include the specified resource path, the link included in the resource acquisition request may be determined to be the original internal link.

S25: if the resource acquisition request includes the target link consistent with the link rewriting rule, extracting page address information from the target link and parsing the page address information into a corresponding external link.

In the present embodiment, if the resource acquisition request includes the target link carrying the specified resource path, the target link may need to be reverted to the corresponding external link. Specifically, the locator identifier may be identified in the target link first, and then the string data indicated by the locator identifier may be identified. Correspondingly, the string data may be extracted as webpage address information in the target link. For example, a target link carrying the specified resource path may be https://www.abc.com/modify?url=https %3A %2F %2Fwww.123.com %2F1.js. Correspondingly, the locator identifier in the target link may be "?url" and the assigned value https %3A %2F %2Fwww.123.com %2F1.js after "?url" may be used as the extracted page address information.

In the present embodiment, when rewriting the external link, the page address information may be formed by encoding the external link using a preset encoding/decoding rule. Correspondingly, after extracting the page address information, the page address information may be decoded to the corresponding external link using the preset encoding/decoding rule. For example, the page address information in the above example may be decoded to the external link https://www.123.com/1.js using the urlencode rule.

S27: acquiring the page resource corresponding to the parsed external link and feeding back the page resource to the client terminal.

In the present embodiment, after parsing the page address information into the corresponding external link, the page resource corresponding to the external link may be acquired and then be fed back to the client terminal.

Furthermore, if the resource acquisition request does not include the target link consistent with the link rewriting rule, the links in the resource acquisition request may all be original internal links. Therefore the page resources corresponding to the links in the resource acquisition request may be acquired directly and then be fed back to the client terminal.

It should be noted that the intermediate server may further have a resource buffer function. After acquiring each page resource, each page resource may be stored in association with a corresponding resource link, and in the meantime each page resource in the target page may be further stored in association with the domain name of the target page. Correspondingly, when there is a subsequent access request directed to the target page from the client terminal, the cache may be checked whether there is corresponding cached data in the cache. If there is corresponding cached data in the cache, the cached data may be fed back to the client terminal directly. Also, after receiving the resource acquisition request from the client terminal, the cache may be checked whether there is cached data corresponding to the resource acquisition request in the cache. If there is cached data corresponding to the resource acquisition request in the cache, the cached data may be fed back directly. If there is no cached data corresponding to the resource acquisition request in the cache, the page resource may be acquired according to above method.

The present disclosure also provides an intermediate server. The intermediate server may include:
  a resource acquisition request receiving unit configured to receive a resource acquisition request directed to a target page from a client terminal,
  a link determination unit configured to determine whether the resource acquisition request includes one or more target links consistent with a link rewriting rule;
  a page address information parsing unit configured to parse page address information from one of the one or more target links and to parse the page address information to a corresponding external link when the resource acquisition request includes the one or more target links consistent with the link rewriting rule;
  and a resource feedback unit configured to acquire page resource corresponding to the parsed external link and feed back the page resource to the client terminal.

In one embodiment, the link determination unit may include:
  a specified resource path determination module, configured to determine whether the resource acquisition request includes one or more links carrying the specified resource path. If the resource acquisition request includes a link carrying the specified resource path, the link carrying the specified resource path may be determined to be the target link consistent with the link rewriting rule. If the resource acquisition request does not include a link carrying the specified resource path, the resource acquisition request may be determined to not include the target links consistent with the link rewriting rule.

In one embodiment, the page address information may be formed by encoding the external link according to a preset encoding/decoding rule. Correspondingly, the page address information parsing unit may be further configured to decode the page address information to the corresponding external link according to the preset encoding/decoding rule.

The present disclosure also provides an intermediate server. The intermediate server may include a memory and a processor. The memory may be configured to store computer programs. When the computer programs are executed by the processor, a page resource acquisition method provided by various embodiments of the present disclosure may be achieved.

In the technical solutions provided by the present disclosure, after receiving the access request directed to the target page from the client terminal, the intermediate server may forward the access request to the origin server and block the resource description file fed back to the client terminal by the origin server. The intermediate server may analyze the content of the resource description file and identify one or more external links in the resource description file. Since the intermediate server in the CDN cannot accelerate the one or more external links directly, the intermediate server may rewrite the one or more external links to a form of internal link, and use an internal link formed by rewriting a corresponding external link of the one or more external links to replace the corresponding original external link in the resource description file. In this way, after rewriting each external link of the one or more external links in the resource description file, the rewritten resource description file may be transmitted to the client terminal. Subsequently, the client terminal may initiate the resource acquisition request with respect to each link in the rewritten resource description file one by one. Since each of the links in the rewritten resource description file has a form of internal link, each of the resource acquisition requests can be received by the intermediate server consequently. The intermediate server then may distinguish links included in the received resource acquisition requests, to identify one or more target links carrying the specified resource path. The specified resource path may indicate that a target link of the one or more target link is not originally the internal link, but the internal link formed by rewriting the external link. Correspondingly, for the target link, the intermediate server may parse an actual external link, and acquire corresponding resource according to the parsed external link to feed back the resource to the client terminal. It can be seen that, in the technical solutions provided by the present disclosure, by rewriting the external links, the links in the resource acquisition request subsequently received by the intermediate server may be guaranteed to have the form of internal link, and therefore each of links may be guaranteed to be accelerated by the intermediate server. Then the intermediate server may revert the internal link formed by rewriting the external link to the corresponding external link by identifying the specified resource path and then acquire the resource corresponding to the external link. In this way, both the internal link and the external link may be accelerated by the intermediate server in the CDN, and the loading speed of the page as a whole may be improved.

Through the description of the above embodiments, those skilled in the art can clearly understand that each embodiment can be implemented by means of software plus a necessary universal hardware platform, or of course, can also be implemented by hardware. Based on such understanding, the above-mentioned technical solution essentially or part that contributes to the existing technology can be embodied in the form of a software product, which can be stored in a computer-readable storage medium, such as ROM/RAM, a magnetic disc, an optical disc, and may include instructions for causing a computer device (which may be a personal computer, a server, or a network device, etc.) to execute the methods described in various embodiments or certain parts of the embodiments.

The above are only preferred embodiments of the present disclosure and are not intended to limit the present disclosure. Any modification, equivalent replacement, or improvement made within the spirit and principle of the present disclosure shall be included in the protection range of the present disclosure.

What is claimed is:

1. A method for processing a resource description file, wherein the method is executed by an intermediate server of a content delivery network, the method comprising:
   receiving an access request directed to a target page sent by a client terminal, and after forwarding the access request to an origin server, receiving the resource description file fed back by the origin server with respect to the access request;
   identifying one or more resource links included in the resource description file and determining whether the identified one or more resource links include one or more external links, and in response to the identified one or more resource links include the one or more external links, rewriting an external link of the one or more external links to an internal link and using the internal link formed by rewriting the external link to replace the corresponding external link in the resource description file; wherein the external link contains a domain name different from a domain name of the target page, the internal link formed by rewriting the external link contains the domain name of the target page, a specified resource path and the external link; and
   feeding back a rewritten resource description file to the client terminal, such that the client terminal acquires resource of the target page from the intermediate server according to the rewritten resource description file and thus the intermediate server accelerates each link in the rewritten resource description file.

2. The method according to claim 1, wherein determining whether the one or more identified resource links include the one or more external links includes:
   determining whether a resource link of the one or more identified resource link includes a domain name; and in response to the resource link includes the domain name, determining whether the domain name in the resource link is consistent with a domain name of the target page; and in response to the domain name in the resource link is consistent with the domain name of the target page, determining the resource link to be an internal link; and in response to the domain name in the resource link is inconsistent with the domain name of the target page, determining the resource link to be an external link; and
   in response to the resource link does not include the domain name, determining the resource link to be an internal link.

3. The method according to claim 1, wherein rewriting the external link to the internal link includes:
   acquiring a domain name of the target page and converting the external link to string data according to a preset encoding/decoding rule; and
   converging the domain name of the target page with the string data according to a preset specified resource path, and using a converged result as the internal link formed by rewriting the external link, wherein: in the internal link formed by rewriting the external link, the domain name of the target page, the specified resource path, and the string data are arranged in an order according to a preset rule.

4. The method according to claim 3, wherein:
the internal link formed by rewriting the external link further includes a locator identifier, wherein the locator identifier is located after the specified resource path and is assigned with the string data.

5. The method according to claim 1, wherein identifying the one or more resource links in the resource description file includes:
identifying one or more link attribute identifiers in the resource description file, and using assigned values of the one or more the link attribute identifiers in the resource description file as corresponding resource links included in the resource description file.

6. The method according to claim 1, further including:
in response to the resource description file does not include the one or more external links, transmitting the resource description file fed back by the origin server to the client terminal.

7. A page resource acquisition method, wherein the method is executed by an intermediate server of a content delivery network, the method comprising:
receiving a resource acquisition request of a target page sent by a client terminal;
determining whether the resource acquisition request includes one or more target links consistent with a link rewriting rule; wherein the target link consistent with the link rewriting rule contains a domain name of the target page, a specified resource path and an external link, the external link contains a domain name different from the domain name of the target page;
in response to the resource acquisition request includes the one or more target links consistent with the link rewriting rule, extracting page address information from a target link of the one or more target links and parsing the page address information to a corresponding external link; and
acquiring a page resource corresponding to the external link obtained by parsing and feeding back the page resource to the client terminal to accelerate the external link.

8. The method according to claim 7, wherein determining whether the resource acquisition request includes the one or more target links consistent with the link rewriting rule includes:
determining whether the resource acquisition request includes one or more links carrying the specified resource path; in response to the resource acquisition request includes the one or more links carrying the specified resource path, determining the one or more links carrying the specified resource path to be the target links consistent the link rewriting rule; and
in response to the resource acquisition request does not include the one or more links carrying the specified resource path, determining that the resource acquisition request does not include the one or more target links consistent with the link rewriting rule.

9. The method according to claim 7, wherein extracting the page address information from the target link includes:
identifying one or more locator identifiers in the target link and using string data indicated by the one or more locator identifier as the extracted page address information.

10. The method according to claim 7, wherein:
the page address information is formed by encoding the external link according to a preset encoding/decoding rule; and
parsing the page address information to the corresponding external link includes decoding the page address information to the corresponding external link according to the preset encoding/decoding rule.

11. The method according to claim 7, further including:
in response to the resource acquisition request does not include the one or more target links consistent with the link rewriting rule, acquiring the page resources corresponding to links included in the resource acquisition request and feeding back the acquired page resource to the client terminal.

12. An intermediate server, comprising:
a memory, configured to store computer programs; and
a processor, configured to execute the computer program stored in the memory, to perform:
receiving an access request directed to a target page sent by a client terminal, and after forwarding the access request to an origin server, receiving a resource description file fed back by the origin server with respect to the access request;
identifying one or more resource links included in the resource description file and determining whether the identified one or more resource links include one or more external links, and in response to the identified one or more resource links include the one or more external links, rewriting an external link of the one or more external links to an internal link and using the internal link formed by rewriting the external link to replace the corresponding external link in the resource description file; wherein the external link contains a domain name different from a domain name of the target page, the internal link formed by rewriting the external link contains the domain name of the target page, a specified resource path and the external link;
feeding back a rewritten resource description file to the client terminal, such that the client terminal acquires resource of the target page according to the rewritten resource description file;
receiving a resource acquisition request of the target page sent by the client terminal;
determining whether the resource acquisition request includes one or more target links consistent with a link rewriting rule;
in response to the resource acquisition request includes the one or more target links consistent with the link rewriting rule, extracting page address information from a target link of the one or more target links and parsing the page address information to a corresponding external link; and
acquiring page resource corresponding to the external link obtained by parsing, and feeding back the page resource to the client terminal to accelerate the external link.

13. The server according to claim 12, wherein, for determining whether the one or more identified resource links include the one or more external links, the processor is further configured to perform:
determining whether a resource link of the one or more identified resource link includes a domain name, in response to the resource link includes the domain name, determining whether the domain name in the resource link is consistent with a domain name of the target page; and in response to the domain name in the resource link is consistent with the domain name of the target page, determining the resource link to be an internal link; and in response to the domain name in the resource link is inconsistent with the domain name of the target page, determining the resource link to be an external link; and in response to the resource link does not include the domain name, determining the resource link to be an internal link.

14. The server according to claim 12, wherein, for rewriting the external link to the internal link, the processor is further configured to perform:

acquiring a domain name of the target page and converting the external link to string data according to a preset encoding/decoding rule; and converging the domain name of the target page and the string data according to a preset specified resource path, and using a converged result as the internal link formed by rewriting the external link, wherein: in the internal link formed by rewriting the external link, the domain name of the target page, the specified resource path, and the string data are arranged in an order according to a preset rule.

15. The server according to claim 14, wherein:

the internal link formed by rewriting the external link further includes a locator identifier, wherein the locator identifier is located after the specified resource path and is assigned with the string data.

16. The server according to claim 12, wherein, for identifying the one or more resource links in the resource description file, the processor is further configured to perform:

identifying one or more link attribute identifiers in the resource description file, and using an assigned value of one link attribute identifier of the one or more the link attribute identifiers in the resource description file as a resource link included in the resource description file.

17. The server according to claim 12, wherein the processor is further configured to perform:

in response to the resource description file does not include the one or more external links, transmitting the resource description file fed back by the origin server to the client terminal.

18. The server according to claim 12, wherein, for determining whether the resource acquisition request includes the one or more target links consistent with the link rewriting rule, the processor is further configured to perform:

determining whether the resource acquisition request includes one or more links carrying the specified resource path; in response to the resource acquisition request includes the one or more links carrying the specified resource path, determining the one or more links carrying the specified resource path to be the one or more target links consistent the link rewriting rule; and in response to the resource acquisition request does not include the one or more links carrying the specified resource path, determining that the resource acquisition request does not include the one or more target links consistent with the link rewriting rule.

19. The server according to claim 12, wherein, for extracting the page address information from the target link, the processor is further configured to perform:

identifying one or more locator identifiers in the target link and using string data indicated by the one or more locator identifier as the extracted page address information.

20. The server according to claim 12, wherein:

the page address information is formed by encoding the external link according to a preset encoding/decoding rule; and parsing the page address information to the corresponding external link includes decoding the page address information to the corresponding external link according to the preset encoding/decoding rule.

* * * * *